United States Patent [19]
Tanabe

[11] Patent Number: 5,816,608
[45] Date of Patent: Oct. 6, 1998

[54] CASING USED IN AIR BAG DEVICES FOR VEHICLES AND A COVER MEMBER USED IN AIR BAG DEVICES FOR VEHICLES

[75] Inventor: Takatoshi Tanabe, Kariya, Japan

[73] Assignee: Denso Corporation, Kariya, Japan

[21] Appl. No.: 854,671

[22] Filed: May 12, 1997

[30] Foreign Application Priority Data

Jul. 22, 1996 [JP] Japan ..................................... 8-192138

[51] Int. Cl.⁶ .................................................. B60R 21/16
[52] U.S. Cl. ........................................ 280/728.2; 280/731
[58] Field of Search .............................. 280/728.2, 728.3, 280/731, 732

[56] References Cited

U.S. PATENT DOCUMENTS 5,060,972 10/1991 Satoh et al. .
5,445,409 8/1995 Abramczyk et al. ................. 280/728.3

Primary Examiner—Paul N. Dickson
Attorney, Agent, or Firm—Cushman Darby & Cushman IP Group of Pillsbury Madison & Sutro LLP

[57] ABSTRACT

A claw extends from a tubular-shaped housing wall which is a part of a casing member to a retaining hole formed in a tubular-shaped fitting wall of the casing member, and is retained by an edge portion of a projection extending from a retaining wall hole to the inside of the retaining hole. When force generated by the air bag held in the casing member operates on the casing member, the claw pushes the projection toward an opening end side of the tubular-shaped fitting wall. However, since the projection extends from the center portion of the retaining wall into the retaining hole, the projection is only crushed toward the opening end side of the tubularshaped fitting wall, and the bottom side of the claw does not directly contact with the retaining wall of the retaining hole if the claw pushes the projection. Therefore, the retaining wall is not cracked at both sides of the projection; and the cover member does not separate from the casing member, and the air bag can be inflated smoothly.

15 Claims, 3 Drawing Sheets

CASING USED IN AIR BAG DEVICES FOR VEHICLES AND A COVER MEMBER USED IN AIR BAG DEVICES FOR VEHICLES

CROSS REFERENCE TO THE RELATED APPLICATION

This application is based on and claims priority of Japanese Patent Application No. Hei. 8-192138 filed on Jul. 22, 1996, the content of which is incorporated herein by reference.

BACKGROUND OF THE INVENTION

1. Field of the Invention:

The present invention relates to a casing used in air bag devices for vehicles and a cover member used in air bag devices for vehicles.

2. Description of Related Art:

In general, as shown in FIG. 4 and FIG. 5, a conventional casing used in air bag devices comprises a casing member H1 and a cover member H2. The casing member H1 is made of metallic materials or synthetic resin and is fixed to a body of a vehicle. The casing member H1 has a tubular-shaped housing wall 10 which holds an air bag B which is folded up and inflatable and also holds an inflator G which inflates the air bag B.

The cover member H2 is made of materials, for instance, thermoplastic elastomer made of synthetic resin or rubber, whose rigidity is lower than the casing member H1, and covers the air bag B. This cover member H2 has a tubular-shaped fitting wall 20 which is coaxially fitted into the tubularshaped housing wall 10 of the casing member H1 and an upper wall 30 which is capable of rupture in the direction of inflation of the air bag B. The tubular-shaped fitting wall 20 is fixed to the upper wall 30 and has plural retaining holes 21 along the circumference of the tubular-shaped fitting wall 20. The retaining hole 21 is in square and defined by four inner walls. The tubular-shaped housing wall 10 has plural claws 11 which extend into the corresponding plural retaining hole 21 from the tubular-shaped housing wall 10 in right angled and isosceles triangle form. As shown in FIG. 6 and FIG. 7, the claw 11 has a bottom side 11a which is retained by a center portion of a retaining wall 22 which is one of the inner walls which defines the retaining hole 21.

In this situation, as shown in FIG. 5, when force F generated by inflation of the air bag B operates in the direction in which the force F ruptures the upper wall 30 of the cover member H2, the retaining wall 22 would move in the direction in which the force F operates against the claw 11 because the casing member H1 is fixed to the body of the vehicle, and the tubular-shaped fitting wall 20 is fixed to the upper wall 30. In this case, as shown in FIG. 8, if the claw 11 shears the center portion of the retaining wall 22 of the retaining hole 21 toward the opening end side of the tubularshaped fitting wall 20 and cracks the tubular-shaped fitting wall 20 as indicated by sign g, the tubular-shaped fitting wall 20 may separate from the tubular-shaped housing wall 10 because the tubular-shaped fitting wall 20 may rupture at a portion of the opening end side. Therefore, the cover member H2 may jump out in the direction in which the force F operates.

SUMMARY OF THE INVENTION

In view of the above problem, a first object of the present invention is to provide a casing used in air bag devices for vehicles, which has a retaining hole which can sufficiently withstand force generated by inflation of the air bag.

Second object of the present invention is to provide a cover member used in air bag devices for vehicles, which has retaining hole which can sufficiently withstand force generated by inflation of the air bag.

In order to accomplish the above-described objects in the present invention, a claw extends from a tubular-shaped housing wall which is a part of a casing member to a retaining hole formed in a tubular-shaped fitting wall of the casing member, and is retained by an edge portion of a projection extending from a retaining wall hole to the inside of the retaining hole. When force generated by the air bag held in the casing member operates on the casing member, the claw pushes the projection toward an opening end side of the tubular-shaped fitting wall. However, since the projection extends from the center portion of the retaining wall into the retaining hole, the projection is only crushed toward the opening end side of the tubular-shaped fitting wall, and the bottom side of the claw does not directly contact with the retaining wall of the retaining hole if the claw pushes the projection.

Therefore, the retaining wall is not cracked at both sides of the projection, and the cover member does not separate from the casing member, and the air bag can be inflated smoothly.

In preferably, a width of the projection is narrower than a width of the claw. When the force generated by the air bag held in the casing member operates on the casing member, the force is absorbed as compressive force with crushing the projection.

In preferably, a side portion of the retaining wall is formed in the form of U-shape at both sides of the projection, and the surface of the side portion is in a smooth curvature without having sharp portions. Therefore, the force is transmitted to the whole surface of each side portion in a uniform way.

BRIEF DESCRIPTION OF THE DRAWINGS

Additional objects and advantages of the present invention will be more readily apparent from the following detailed description of preferred embodiments thereof when taken together with the accompanying drawings, in which.

DETAILED DESCRIPTION OF THE PREFERRED EMBODIMENT

Preferred embodiments of the present invention are described hereinafter with reference to the accompanying drawings.

Figure 1:
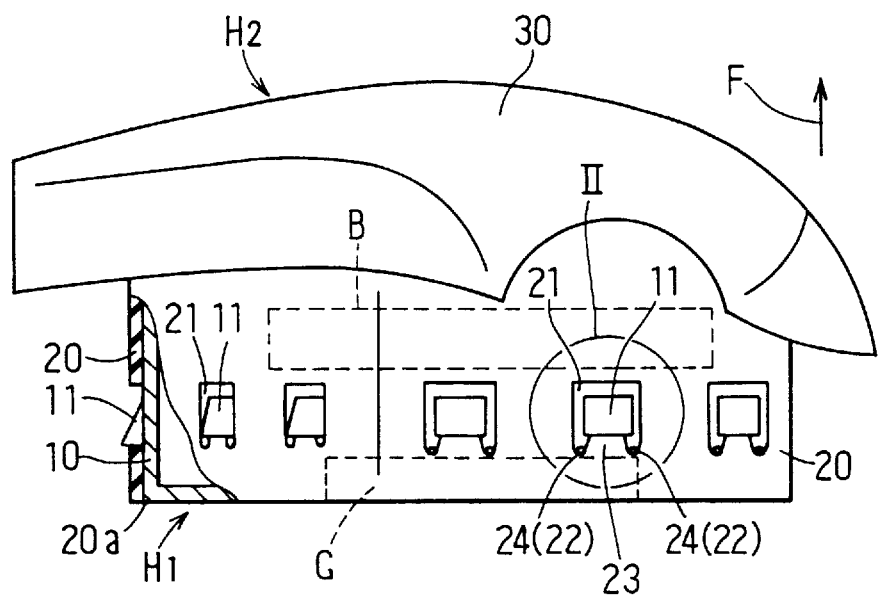
FIG. 1 is a side view illustrating an air bag device for vehicles according to a preferred embodiment of the present invention.
Figure 2:
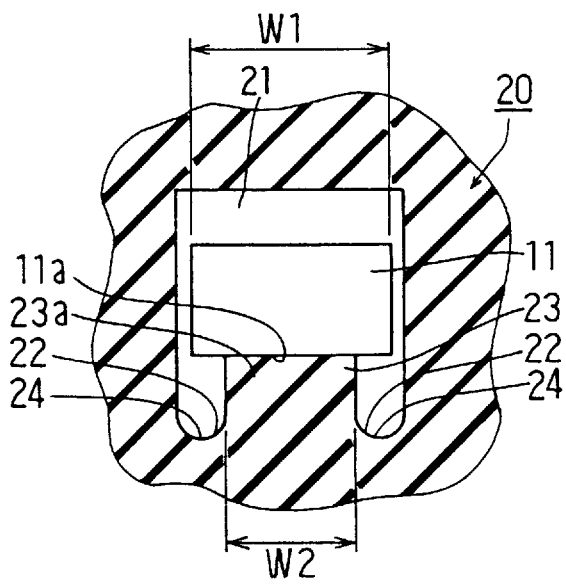
FIG. 2 is an enlarged side view illustrating a circle portion indicated by sign II in FIG. 1.
Figure 3:
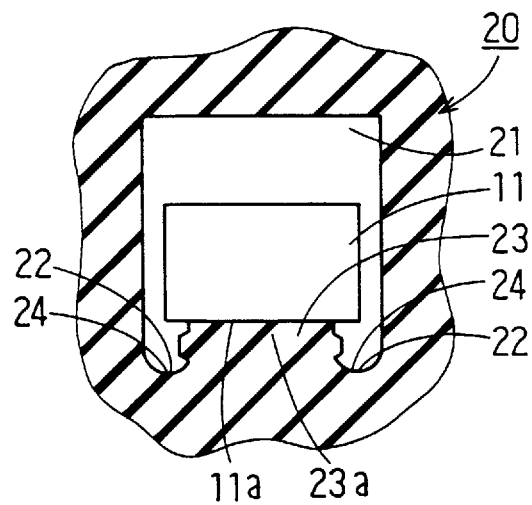
FIG. 3 is an enlarged partial side view illustrating conditions in which a projection is crushed by force F generated by inflation of the air bag device.
Figure 4:
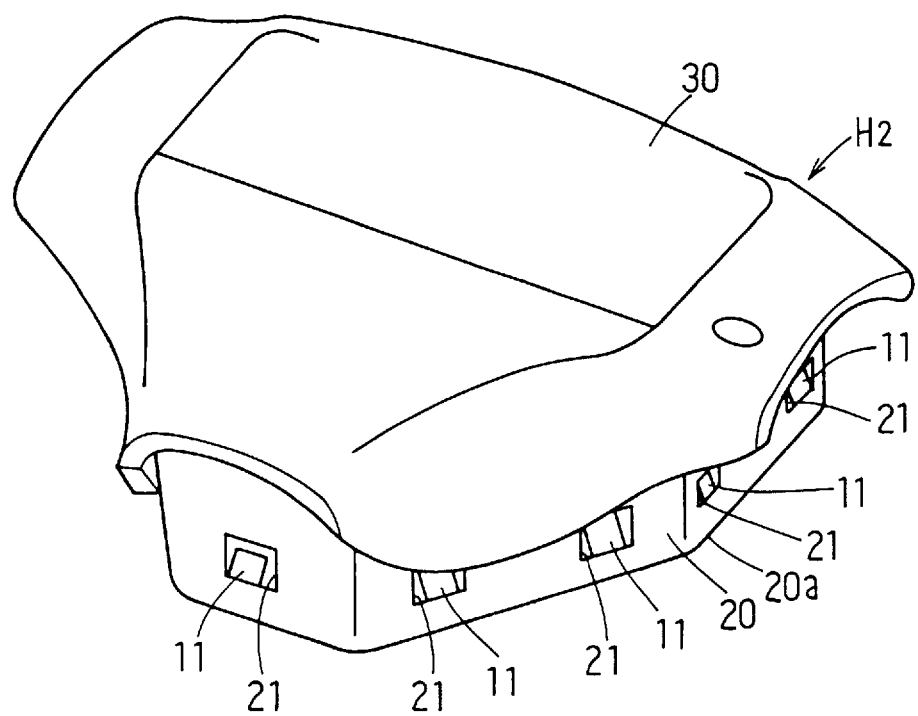
FIG. 4 is a perspective view illustrating an air bag device for vehicles according to a related art.
Figure 5:
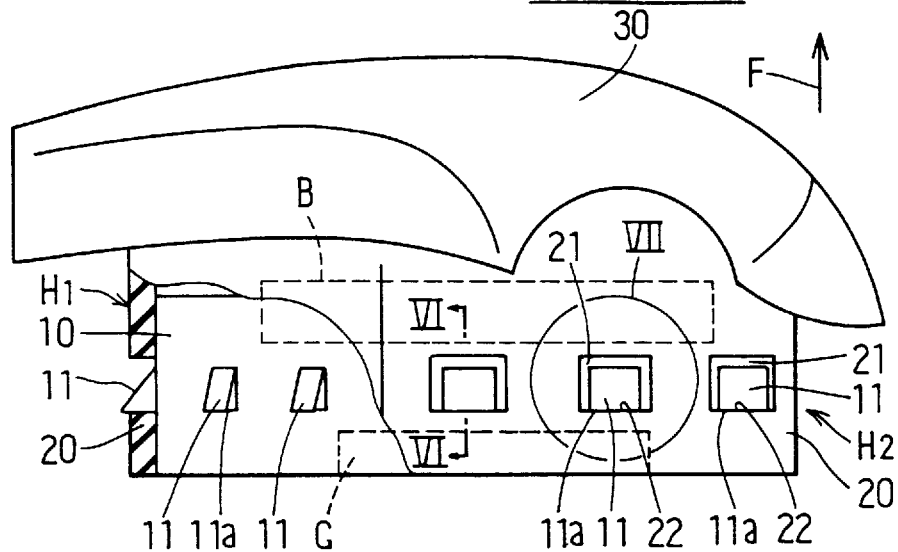
FIG. 5 is a side view illustrating the air bag device illustrated in FIG. 4.
Figure 6:
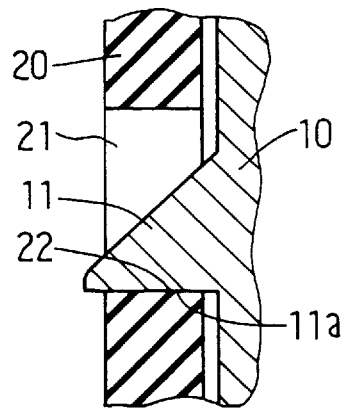
FIG. 6 is a cross-sectional view taken on line VI—VI in FIG. 5.
Figure 7:
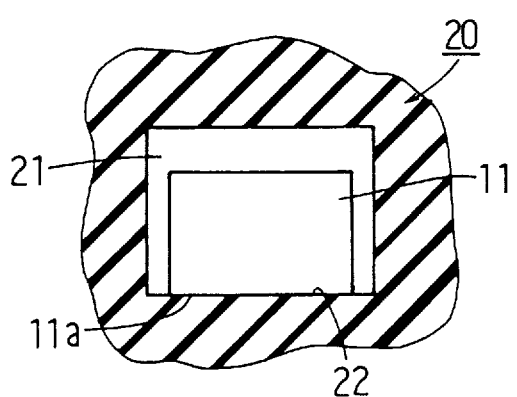
FIG. 7 is an enlarged side view illustrating a circle portion indicated by sign VII in FIG. 5.
Figure 8:
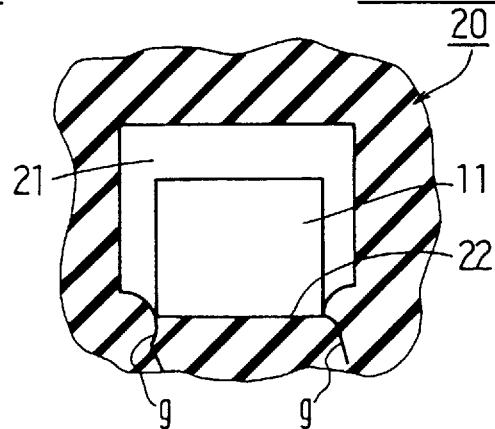
FIG. 8 is an enlarged partial side view illustrating conditions in which an edge of an inner wall of a retaining hole is cracked by force F generated by inflation of the air bag device according to a situation in FIG. 7.

FIGS. 1–3 show a preferred embodiment of the present invention. In this embodiment, the same parts as the air bag devices illustrated in FIGS. 4–7 are denoted by the same signs as in the air bag devices illustrated in FIGS. 4–7 and repeated description is omitted for brevity.

A casing member H1 may be fitted into a cover member H2 from an opening side of a tubular-shaped housing wall 10 as an opening portion of the tubular-shaped housing wall 10 opposes a upper wall 30 of the cover member H2. This embodiment is characterized by the structure of a retaining wall 22 which is one of the inner walls at an opening end side of the tubularshaped fitting wall 20 (at an opposite side against the direction of inflation of an air bag B) which define a retaining hole 21 formed in a tubular-shaped fitting wall 20 of the cover member H2. That is, a square (rectangular-shaped) projection 23 extends from the center portion of the retaining wall 22 into the retaining hole 21, and a circumferential width W2 of the projection 23 is narrower than a circumferential width W1 of claw 11 (see FIG. 2). The projection 23 has an edge portion 23a which retains a central portion of a bottom side 11a of the claw 11 formed on the tubular-shaped housing wall 10 of the casing member H1 from below. Furthermore, the retaining hole 21 has a pair of side portions 24 in the form of U-shape next to the projection 23 of the retaining wall 22.

In this embodiment, when the air bag B held in the casing member H1 is inflated toward the upper wall 30 of the cover member H2 by means of gas pressure generated by inflator G, force F generated in the direction indicated by an arrow in FIG. 1 by the inflation of the air bag B operates on the upper wall 30. In this condition, because the casing member H1 is fixed to the body of the vehicle and the casing member H1 is fixed to the body of the vehicle and the tubular-shaped fitting wall 20 is fixed to the upper wall 30, the projection 23 of the retaining hole 21 would move in the direction in which the force F operates against the claw 11. As a result of this operation, the claw 11 pushes the center portion of the projection 23 downward in FIG. 2.

However, as shown in FIG. 3, since the projection 23 extends from the center portion of the retaining wall 22 toward the inside of the retaining hole 21, the projection 23 is only crushed toward the opening end 20a side of the tubular-shaped fitting wall 20, if the claw 11 pushes downward on the each projection 23. The bottom side 11a of the claw 11 contacts not the retaining wall 22 of the retaining hole 21 but the edge portion 23a. Furthermore, since the circumferential width W2 of the projection 23 is narrower than the circumferential width W1 of claw 11, the force F is absorbed as not shearing force but compressive force in the process of crushing each projection 23 even if the each projection 23 is crushed. Furthermore, since the side portion 24 of the retaining wall 22 is formed in the form of U-shape at both sides of the projection 23, the surface of the side portion 24 is in smooth curvature without having sharp portions. Therefore, the force F is transmitted to the whole surface of each side portion 24 in a uniform way.

Therefore, if the force F operates as above, the retaining wall 22 is not cracked at both sides of the projection 23, and the tubular-shaped fitting wall 20 of the cover member H2 can be sufficiently held by the projection 23 and the claw 11 of the tubular-shaped housing wall 10 of the casing member H1. As a result, the air bag B can be smoothly inflated toward a passenger, and the cover member H2 does not separate from the casing member H1 because the cover member H2 ruptures not at the portion of the opening end 20a side of the tubular-shaped fitting wall 20 but at the upper wall 30 toward the operating direction of the force F certainly.

The present invention may be embodied in still other ways without departing from the spirit or essential character thereof. For instance, it is possible to fit the tubularshaped fitting wall 20 of the cover member H2 into the inside of the tubular-shaped housing wall 10 of the casing member H1. Other curvature-shapes than the U-shape can be applied to the side portion 24 while accomplishing the same effect described above. The edge portion of the projection 23 may be in the form of a mountain or a fork which has a curvature edge.

Furthermore, the casing member H1 may be fitted into the cover member H2 from a bottom wall side of the tubular-shaped housing wall 10 as the bottom wall of the tubular-shaped housing wall 10 opposes the upper wall 30 of the cover member H2 with the opening of the tubular-shaped housing wall 10 facing outside.

What is claimed is:

1. A casing used in air bag devices for a vehicle comprising:
    a casing member, said casing member including a tubular-shaped housing wall for holding an air bag therein, and
        a claw formed on said tubular-shaped housing wall; and
    a cover member having a rigidity lower than said casing member, and capable of rupture in the direction of inflation of said air bag, said cover member including
        a tubular-shaped fitting wall for fitting with said tubular-shaped housing wall, said tubular-shaped fitting wall including
            a retaining hole defined by plural inner walls,
            one of said inner walls at an opening end side of said tubular-shaped fitting wall defining a retaining wall, and
            a projection extending from a center portion of said retaining wall into inside said retaining hole and having an edge portion in said retaining hole;
    wherein said claw extends into said retaining hole and is retained by said edge portion of said projection.

2. A casing used in air bag devices for a vehicle according to claim 1, wherein a width of said projection is narrower than a width of said claw.

3. A casing used in air bag devices for a vehicle according to claim 1, wherein said retaining wall is formed as a curvature portion which is in the form of a convex toward said opening end side of said tubular-shaped fitting wall.

4. A casing used in air bag devices for a vehicle according to claim 3, wherein said curvature portion is U-shaped.

5. A casing used in air bag devices for a vehicle according to claim 3, wherein said projection is rectangular-shaped.

6. A casing used in air bag devices for a vehicle according to claim 1, wherein said casing member is for holding an inflator for inflating said air bag.

7. A casing used in air bag devices for a vehicle according to claim 1, wherein said tubular-shaped fitting wall is for includes said retaining hole at at least two locations which oppose to each other radially.

8. A casing used in air bag devices for a vehicle comprising:
    a casing member, said casing member including
        a tubular-shaped housing wall for holding an air bag therein, and
        a claw formed on said tubular-shaped housing wall; and
    a cover member having a rigidity lower than said casing member, and capable of rupture in the direction of inflation of said air bag, said cover member including
        a tubular-shaped fitting wall for fitting with said tubular-shaped housing wall, said tubular-shaped fitting wall including a retaining hole defined by plural inner walls, one of said inner walls at an opposite side against the direction of inflation of said air bag, and a projection extending from a center portion of said retaining wall into inside said retaining hole and having an edge portion in said retaining hole; wherein said claw extends into said retaining hole and is retained by said edge portion of said projection.

9. A cover member used in air bag devices for a vehicle, fitted into a casing member which holds an air bag and has a tubular-shaped housing wall which has a claw, and has a rigidity lower than said casing member, and capable of rupture in the direction of inflation of said air bag, said cover member comprising:

a tubular-shaped fitting wall for fitting with said tubular-shaped housing wall, said tubular-shaped fitting wall including a retaining hole defined by plural inner walls, one of said inner walls at an opening end side of said tubular-shaped fitting wall defining a retaining wall and a projection extending from a center portion of said retaining wall into inside said retaining hole and having an edge portion in said retaining hole;

wherein said claw extends into said retaining hole and is retained by said edge portion of said projection.

10. A casing used in air bag devices for a vehicle according to claim 9, wherein a width of said projection is narrower than a width of said claw.

11. A casing used in air bag devices for a vehicle according to claim 9, wherein said retaining wall is formed as a curvature portion which is in the form of a convex toward said opening end side of said tubularshaped fitting wall.

12. A casing used in air bag devices for a vehicle according to claim 11, wherein said curvature portion is U-shaped.

13. A casing used in air bag devices for a vehicle according to claim 11, wherein said projection is rectangular-shaped.

14. A casing used in air bag devices for a vehicle according to claim 9, wherein said casing member is for holding an inflator for inflating said air bag.

15. A casing used in air bag devices for a vehicle according to claim 9, wherein said tubular-shaped fitting wall is for includes said retaining hole at at least two locations which opposes each other radially.

* * * * *